(12) United States Patent
Chen et al.

(10) Patent No.: US 11,465,227 B2
(45) Date of Patent: Oct. 11, 2022

(54) SYSTEM AND METHOD FOR MANUFACTURING HIGH-STRENGTH BONDED METAL SHEETS FOR A BATTERY CELL

(71) Applicants: GM Global Technology Operations LLC, Detroit, MI (US); Penn State Research Foundation, University Park, PA (US)

(72) Inventors: Nannan Chen, Warren, MI (US); Hongliang Wang, Sterling Heights, MI (US); Zhongyi Liu, Troy, MI (US)

(73) Assignees: GM GLOBAL TECHNOLOGY OPERATIONS LLC, Detroit, MI (US); THE PENN STATE RESEARCH FOUNDATION, University Park, PA (US)

( * ) Notice: Subject to any disclaimer, the term of this patent is extended or adjusted under 35 U.S.C. 154(b) by 0 days.

(21) Appl. No.: 17/174,971

(22) Filed: Feb. 12, 2021

(65) Prior Publication Data
US 2022/0258274 A1 Aug. 18, 2022

(51) Int. Cl.
    *B23K 11/16* (2006.01)
    *B32B 15/01* (2006.01)
    (Continued)

(52) U.S. Cl.
    CPC ............ *B23K 11/163* (2013.01); *B23K 11/20* (2013.01); *B23K 11/24* (2013.01); *B32B 15/01* (2013.01);
    (Continued)

(58) Field of Classification Search
    CPC ................ A61N 1/3754; A61N 1/3752; H01L 2224/80001; H01L 2224/80203; H01L 2224/80385; H01L 2224/81191; H01L 2224/81203; H01L 2224/81385; H01L 2224/81898; H01L 2224/82;
    (Continued)

(56) References Cited

U.S. PATENT DOCUMENTS

| 4,409,278 A | 10/1983 | Jochym |
| 4,794,050 A | 12/1988 | Campbell et al. |

FOREIGN PATENT DOCUMENTS

| DE | 10217624 | 11/2003 |
| WO | WO 2019160701 | * 8/2019 |

* cited by examiner

*Primary Examiner* — Dana Ross
*Assistant Examiner* — Joseph W Iskra
(74) *Attorney, Agent, or Firm* — Vivacqua Crane, PLLC

(57) ABSTRACT

System and method of manufacturing high-strength bonded metal sheets for a battery cell are provided. The method comprises providing a stackup comprising a first metal sheet and a second metal sheet. The first and second metal sheets are separated by a first coating layer. The first coating layer comprises nickel-phosphide. The first metal sheet includes a first material of a first melting point and the second metal sheet includes a second material of a second melting point. The first coating layer including a third material of a third melting point. The method further comprises heating the stackup to allow crystallization of nickel in the first coating layer and remove the residual nickel-phosphide defining an enhanced coating layer. The enhanced coating layer comprises crystallized nickel for high-strength solid state bonding of the first and second metal sheets to the enhanced coating layer.

8 Claims, 1 Drawing Sheet

(51) Int. Cl.
*B23K 11/24* (2006.01)
*H01M 50/119* (2021.01)
*H01M 50/124* (2021.01)
*B32B 15/20* (2006.01)
*B23K 11/20* (2006.01)
*B23K 103/18* (2006.01)
*B23K 101/18* (2006.01)

(52) U.S. Cl.
CPC ........... *B32B 15/20* (2013.01); *H01M 50/119* (2021.01); *H01M 50/124* (2021.01); *B23K 2101/18* (2018.08); *B23K 2103/18* (2018.08)

(58) Field of Classification Search
CPC ..... H01L 2224/821; H01L 2224/82138; H01L 2224/82203; H01L 2224/8236; H01L 2224/82895; H01L 2224/9212; H01L 2224/92124; H01L 2224/92144; H01L 23/49811; H01L 23/4985; H01L 24/24; H01L 24/81; H01L 24/82; H01L 24/92; H05K 1/028; H05K 1/0313; H05K 1/09; H05K 1/112; H05K 1/189; H05K 2201/0129; H05K 2201/0141; H05K 2201/0154; H05K 2203/1316; H05K 2203/1327; H05K 2203/166; H05K 3/285; H05K 3/303; H05K 3/4076; H05K 3/4661; H05K 5/065
USPC ...................................................... 219/78.02
See application file for complete search history.

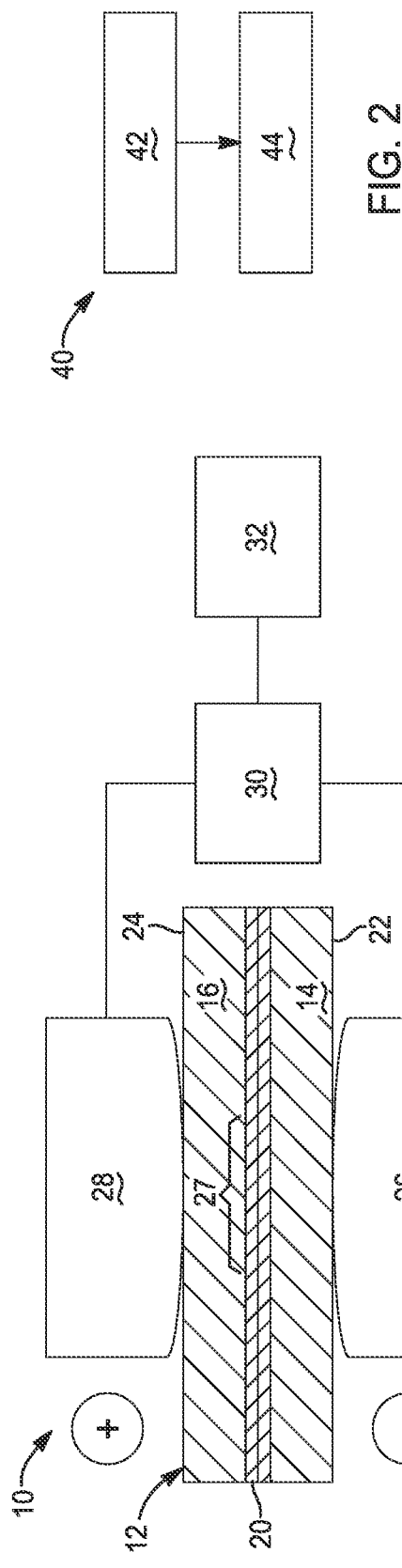
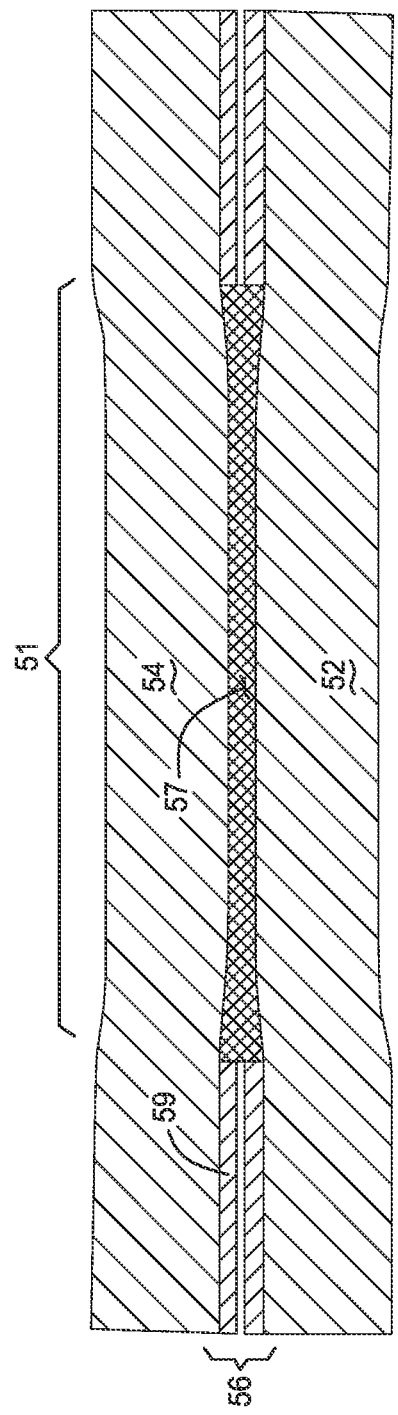

SYSTEM AND METHOD FOR MANUFACTURING HIGH-STRENGTH BONDED METAL SHEETS FOR A BATTERY CELL

INTRODUCTION

The present disclosure relates to joining metal sheets for battery cells and, more particularly, systems and methods of manufacturing high-strength bonded metal sheets for battery cells via resistive spot welding.

Battery pack assemblies are used in vehicles for hybrid and electric engines. Potential battery pack architecture may be required to be configured to handle lap-shear and coach-peel forces. Current battery pack assemblies may not be configured to handle both lap-shear and coach-peel forces.

SUMMARY

Thus, while current manufacturing processes and systems achieve their intended purpose, there is a need for a new and improved system and method of manufacturing high-strength bonded metal sheets for battery cells.

According to one aspect of the present disclosure, a method of manufacturing high-strength bonded metal sheets for a battery cell is disclosed. The method comprises providing a stackup comprising a first metal sheet and a second metal sheet. The first and second metal sheets are separated by a first coating layer. The first coating layer comprises nickel-phosphide. The first metal sheet includes a first material of a first melting point, and the second metal sheet includes a second material of a second melting point. The first coating layer includes a weld portion and a third material of a third melting point.

The method further comprises heating the stackup to remove nickel phosphide from the weld portion of the first coating layer and to allow crystallization of nickel at the weld portion. The crystallization of nickel defines an enhanced coating layer comprising crystallized nickel for high-strength solid state bonding of the first and second metal sheets to the enhanced coating layer.

In one example of this aspect, the first material is the same as the second material and the first melting point is the same as the second melting point.

In another example, the first material is different than the second material and the first melting point is different than the second melting point.

In yet another example, the first material is one of copper, nickel, and titanium, and the second material is one of copper, nickel, and titanium.

In another example, the enhanced coating layer comprises about 70% weight to 100% weight nickel in the weld portion. In another example, the first coating layer comprises between about 2% weight and about 13% weight phosphorus in nickel-phosphide.

In yet another example of this aspect, the step of heating the stackup comprises applying a mechanical load to the stackup for bonding the first and second metal sheets. The step of heating further comprises heating the stackup to the third melting point to allow crystallization of nickel in the weld portion of the first coating layer and to remove nickel-phosphide from the weld portion.

In still another example, the step of heating the stackup comprises applying a mechanical load to the stackup for bonding the first and second metal sheets and melting the nickel-phosphide in the weld portion of the first coating layer. The step of heating further comprises, by way of the mechanical load, moving the nickel-phosphide from the weld portion to allow crystallization of nickel in the weld portion of the first coating layer and remove nickel-phosphide therefrom.

In another example of this aspect, the step of heating comprises heating the stackup to the third melting point based on percent weight content phosphorous in nickel-phosphide of the first coating layer.

In accordance with another aspect of the present disclosure, a system for manufacturing high-strength bonded metal sheets for a battery cell is disclosed. The system comprises a stackup comprising a first metal sheet and a second metal sheet. The first and second metal sheets are separated by a first coating layer.

In this aspect, the first coating layer comprises nickel-phosphide. The first metal sheet defines a negative side of the stackup and includes a first material of a first melting point. The second metal sheet defines a positive side of the stackup and includes a second material of a second melting point. The first coating layer includes weld portion and a third material of a third melting point.

In this embodiment of this aspect, the system further comprises a first electrode configured to contact the negative side of the stackup to heat the stackup for removing the nickel-phosphide from weld portion of the first coating layer and allowing crystallization of nickel therein. The crystallization of nickel defines an enhanced coating layer comprising a welded portion comprising crystallized nickel for high-strength solid state bonding of the first metal sheet and the enhanced coating layer.

In this embodiment, the system further comprises a second electrode configured to contact the positive side of the stackup to heat the stackup for removing the nickel-phosphide from the weld portion of the first coating layer and allowing crystallization of nickel in the enhanced coating layer. The crystallization of nickel in the welded portion of the enhanced coating layer provides high-strength solid state bonding of the second metal sheet and the enhanced coating layer.

The system further comprises a power source configured to power the first and second electrodes and a controller configured to control the power to the first and second electrodes to heat the stackup.

In another embodiment of this aspect of the present disclosure, the first material is the same as the second material and the first melting point is the same as the second melting point.

In another embodiment, the first material is different than the second material and the first melting point is different than the second melting point.

In yet another embodiment, the first material is one of copper, nickel, and titanium, and the second material is one of copper, nickel, and titanium.

In another embodiment of this aspect, the first coating layer comprises between about 2% weight and about 13% weight phosphorus in nickel-phosphide, and the enhanced coating layer comprises about 70% weight to 100% weight nickel in the welded portion.

In one other embodiment, the first and second electrodes are configured to heat the stackup with a mechanical load to the third melting point to allow crystallization of nickel in the weld portion of the first coating layer and remove nickel-phosphide from the weld portion.

In yet another embodiment, the first and second electrodes are configured to heat the stackup with a mechanical load to melt the nickel-phosphide in the weld portion of the first coating layer, to allow crystallization of nickel in the first coating layer, and to remove nickel-phosphide from the weld portion.

In still another embodiment of this aspect, the first and second electrodes are configured to heat the stackup to the third melting point based on percent weight content of phosphorous in nickel-phosphide of the first coating layer.

In another aspect of the present disclosure, a high-strength welded metal stackup for a battery cell is provided. The stackup comprises a first metal sheet including a first material of a first melting point, and a second metal sheet including a second material of a second melting point.

In this embodiment, the stackup comprises an enhanced coating layer disposed between the first metal sheet and the second metal sheet. The enhanced coating layer comprises a welded portion and crystallized nickel in a solid state bond with each of the first and second metal sheets for high-strength.

In one embodiment of this aspect, the first material is one of copper, nickel, and titanium, and wherein the second material is one of copper, nickel, and titanium.

In another embodiment, the enhanced coating layer comprises about 70% weight to 100% weight nickel in the welded portion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a schematic view of a system for manufacturing high-strength bonded metal sheets via resistive joining for a battery cell in accordance with one embodiment of the present disclosure.

FIG. 2 is a flowchart of one method of manufacturing high-strength bonded metal sheets for a battery cell implemented by the system in FIG. 1 in accordance with one example of the present disclosure.

FIG. 3 is a cross-sectional side view of a high-strength bonded metal sheet stackup implemented by the method in FIG. 2 in accordance with one embodiment of the present disclosure.

DETAILED DESCRIPTION

The following description is merely exemplary in nature and is not intended to limit the present disclosure, application, or uses.

The present disclosure provides systems and methods for manufacturing high-strength bonded metal sheets of stackups for battery cells by way of resistive joining such as resistive spot welding. The systems and methods disclosed herein provide ways to manufacture high-strength bonded metal sheets of stackups that carry both lap-shear strength and coach-peel strength for potential battery pack architecture. Moreover, the present disclosure provides systems and methods that improve both lap-shear and coach-peel behavior of bonded metal sheets by taking advantage of a microstructural evolution of the stackups caused by electromigration during bonding.

In accordance with one embodiment of the present invention, FIG. 1 illustrates a system 10 for manufacturing high-strength bonded metal sheets for a battery cell. As shown, the system 10 comprises a first stackup 12 comprising a first metal sheet 14 and a second metal sheet 16. Moreover, the first and second metal sheets 14, 16 are separated by a first coating layer 20.

The first metal sheet 14 defines a negative side 22 of the first stackup 12 and includes a first material of a first melting point. The second metal sheet 16 defines a positive side 24 of the first stackup 12 and includes a second material of a second melting point. Preferably, the first material is comprised of the same components as the second material and the first melting point is the same as the second melting point. However, it is to be understood that the first material may be comprised of different components than the second material and the first melting point may be different than the second melting point without departing from the spirit or scope of the present disclosure. For example, the first material may be one of copper, nickel, and titanium. Likewise, the second material may be one of copper, nickel, and titanium. Preferably, but not necessarily, the first and second materials are made of copper.

In this embodiment, the first coating layer 20 includes a weld portion 27 and a third material of a third melting point. Preferably, the first coating layer 20 comprises nickel-phosphide. In this example, the first coating layer 20 comprises between about 2% weight and about 13% weight phosphorus in nickel-phosphide.

As depicted in FIG. 1, the system 10 further comprises a first electrode 26 and a second electrode 28 configured to contact the first stackup 12. As shown, the first electrode 26 is configured to contact the negative side 22 of the first stackup 12 and the second electrode 28 is configured to contact the positive side 24 of the first stackup 12. When powered, the first and second electrodes 26, 28 heat the first stackup 12 to allow crystallization of nickel in the weld portion 27 of the first coating layer 20 and to remove nickel-phosphide from the weld portion 27 as will be described in greater detail below. The crystallization of nickel at the weld portion defines an enhanced coating layer as described in greater detail below.

Preferably, along with a mechanical load mechanism (not shown), the first and second electrodes 26, 28 are configured to heat the weld portion 27 of the first coating layer 20 to melt nickel-phosphide from the weld portion 27 and allow crystallization of nickel therein, thereby removing nickel-phosphide from the weld portion 27. As such, the first and second electrodes 26, 28 heat the weld portion 27 of the first coating layer 20 to the third melting point to allow crystallization of nickel in the weld portion 27 and to remove nickel-phosphide therefrom. Preferably, the first and second electrodes 26, 28 heat the first stackup 12 to the third melting point based on percent weight content of phosphorous in nickel-phosphide of the first coating layer 20.

In this embodiment, the enhanced coating layer comprises crystallized nickel for high-strength solid state bonding of the first and second metal sheets 14, 16 to the enhanced coating layer. The enhanced coating layer preferably comprises about 70% weight to 100% weight nickel at bonded portion 51 (shown in FIG. 3).

In accordance with this embodiment, the system 10 further comprises a power source 30 configured to power the first and second electrodes 26, 28 as illustrated in FIG. 1. As shown, the power source 30 is connected to the first and second electrodes 26, 28. Moreover, the system 10 comprises a controller 32 in communication with the power source 30 and configured to control the power to the first and second electrodes 26, 28 to heat the first stackup 12.

In accordance with one example of the present disclosure, FIG. 2 depicts a method 40 of manufacturing high-strength bonded metal sheets for a battery cell. As shown, the method 40 comprises in box 42 providing the first stackup 12 comprising the first metal sheet 14 and the second metal sheet 16. Moreover, the first and second metal sheets 14, 16 are separated by the first coating layer 20 as illustrated in FIG. 1.

As discussed above, the first metal sheet 14 includes the first material of the first melting point. Moreover, the second metal sheet 16 includes the second material of the second melting point. Preferably, the first material is comprised of the same components as the second material and the first melting point is the same as the second melting point. However, it is to be understood that the first material may be comprised of different components than the second material and the first melting point may be different than the second melting point without departing from the spirit or scope of the present disclosure.

For example, the first material may be one of copper, nickel, and titanium. Likewise, the second material may be one of copper, nickel, and titanium. Preferably, but not necessarily, the first and second materials are made of copper.

As in the embodiment of FIG. 1, the first coating layer 20 includes the weld portion 27 and the third material of the third melting point. Preferably, the first coating layer 20 comprises nickel-phosphide. In this example, the first coating layer 20 comprises between about 2% weight and about 13% weight phosphorus in nickel-phosphide.

As shown in FIG. 2, The method 40 further comprises in box 44 heating the stackup 12 to remove nickel phosphide from the weld portion 27 of the first coating layer 20 and to allow crystallization of nickel at the weld portion 27. The step of heating may be accomplished by the system 10 shown in FIG. 1 along with a mechanical load mechanism (not shown). Moreover, from heating and mechanical load, the crystallization of the nickel defines an enhanced coating layer 56 (see FIG. 3) comprising a bonded portion 51 comprising crystallized nickel for high-strength solid state bonding of metal sheets to the enhanced coating layer 56.

It is to be understood that prior to the step of heating, the first coating layer 20 contains Nickel that is in a non-crystalline or amorphous state. An amorphous or non-crystalline solid may be viewed as a solid that lacks long-range order, characteristic of a crystal. That is, an amorphous structure may be used to describe a solid that does not exhibit crystalline structure. While there may be local ordering of the atoms or molecules in an amorphous solid, no long-term ordering is typically present.

Moreover, it is to be understood that the enhanced coating layer comprises between about 70% weight and 100% weight crystallized Nickel in the bonded portion. Crystallization may be viewed as the solidification of atoms or molecules into a highly structured form called a crystal. A crystal or crystalline solid may be viewed as a solid material whose constituents (such as atoms, molecules, or ion) are arranged in a highly ordered microscopic structure, forming a crystal lattice that extends in all or various directions.

During the step of heating, components of the first and second metal sheets 14, 16 undergo solid state bonding with the enhanced coating layer. Solid state bonding may be viewed as bonding by material interdiffusion at an elevated temperature. Thus, metal components (e.g., copper) of the first and second metal sheets 14, 16 materially interdiffuse with the crystallized Nickel of the enhanced layer, resulting in a stackup having high-strength bonded metal sheets with improved coach-peel behavior.

When powered, the first and second electrodes 26, 28 provide an electric field resulting in heat to the weld portion 27 of the first coating layer 20. Then, electromigration is triggered by the electric field causing kinetic energy transfer to Nickel atoms by way of electron-to-Nickel atom collisions. Due to electron velocity and momentum caused by a dominant electron force towards the positive side 24 of the first stackup 12, Nickel atoms move or migrate towards the positive side 24 of the first stackup 12. At the weld portion, the Nickel electromigration results in a higher concentration (e.g., by % weight) of Nickel-Phosphide adjacent the negative side 22 and a higher concentration (e.g., by % weight) of Nickel adjacent the positive side 24 of the first stackup 12.

At the weld portion, the higher concentration of Nickel-Phosphide results in a lower melting point thereof and in turn the Nickel-Phosphide melts. Due to the mechanical load, Nickel-Phosphide is pushed or forced or squeezed from the weld portion of the first coating layer, thereby further increasing the concentration at the weld portion of Nickel which then crystallizes during further heating. Moreover, solid state bonding occurs between components (e.g., copper) of the first and second metal sheets 14, 16 and the crystallized nickel of the enhanced coating layer. As a result, a high-strength bonded metal sheets stackup with improved coach-peel behavior is provided.

For example, when the first coating layer 20 comprises about 2 weight percent phosphorous of nickel-phosphide (Ni—P), the third melting point is about 1350 degreed Celsius (C). Moreover, when the first coating layer 20 comprises about 8 weight percent phosphorous of Ni—P, the third melting point is about 1050 C. Furthermore, when the first coating layer 20 comprises about 11 weight percent phosphorous of Ni—P, the third melting point is about 900 C.

In another example of this aspect, the step of heating the first stackup 12 comprises applying a mechanical load to the first stackup 12 for bonding the first and second metal sheets 14, 16. The mechanical load may range between about 100 pounds and 500 pounds.

In this example, the step of heating further comprises heating the first stackup 12 to the third melting point to allow crystallization of nickel in the weld portion of the first coating layer 20 and remove the nickel-phosphide therefrom. That is, heating the first stackup 12 to the third melting point melts the nickel-phosphide in the weld portion of the first coating layer 20. By way of the mechanical load, the nickel-phosphide is moved or squeezed from the weld portion of the first coating layer 20, thereby removing the nickel-phosphide therefrom and allowing crystallization of nickel therein. Preferably, the first stackup 12 is heated to the third melting point based on percent weight content of phosphorous in nickel-phosphide of the first coating layer.

It is to be understood that the step of heating may range from about 800 degrees C. to about 1500 degrees C. for a duration of between about 100 milliseconds to about 1000 milliseconds. In other examples, the duration may be longer or shorter such as 0.05 second to 60 seconds without departing from the scope or spirit of the present disclosure.

In one embodiment of the present disclosure, FIG. 3 illustrates a high-strength welded metal stackup or enhanced stackup 50 for a battery cell. In this embodiment, the system 10 and method 40 were implemented to manufacture the enhanced stackup 50 having a welded or bonded portion 51. Moreover, the enhanced stackup 50 comprises a first metal layer 52 including the first material of the first melting point.

The enhanced stackup 50 further comprises a second metal layer 54 including the second material of the second melting point.

Preferably, the first material is comprised of the same components as the second material and the first melting point is the same as the second melting point. However, it is to be understood that the first material may be comprised of different components than the second material and the first melting point may be different than the second melting point without departing from the spirit or scope of the present disclosure. For example, the first material may be one of copper, nickel, and titanium. Likewise, the second material may be one of copper, nickel, and titanium. Preferably, but not necessarily, the first and second materials are made of copper.

As shown in FIG. 3, the enhanced stackup 50 further comprises an enhanced coating layer 56 disposed between the first metal layer 52 and the second metal layer 54. At the bonded portion 51, the enhanced coating layer 56 comprises crystallized nickel 57 and is in a solid state bond with each of the first and second metal layers 52, 54 for high-strength bonding. As shown, a remainder portion 59 of the enhanced coating layer is comprised of Nickel-Phosphide. Preferably, at the bonded portion 51, the enhanced coating layer 56 comprises about 70% weight to 100% weight of crystallized nickel.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for manufacturing high-strength bonded metal sheets for a battery cell, the system comprising:
   a stackup comprising a first metal sheet and a second metal sheet, the first and second metal sheets separated by a first coating layer, the first coating layer comprising nickel-phosphide, the first metal sheet defining a negative side of the stackup and including a first material of a first melting point, the second metal sheet defining a positive side of the stackup including a second material of a second melting point, the first coating layer including a weld portion and a third material of a third melting point; and
   a first electrode configured to contact the negative side of the stackup to heat the stackup for removing the nickel-phosphide from the weld portion of the first coating layer and allowing crystallization of nickel therein to define an enhanced coating layer comprising crystallized nickel for high-strength solid state bonding of the first metal sheet and the enhanced coating layer;
   a second electrode configured to contact the positive side of the stackup to heat the stackup for removing the nickel-phosphide from the weld portion of the first coating layer and allowing crystallization of nickel in the enhanced coating layer for high-strength solid state bonding of the second metal sheet and the enhanced coating layer;
   a power source configured to power the first and second electrodes; and
   a controller configured to control the power to the first and second electrodes to heat the stackup.

2. The system of claim 1 wherein the first material is the same as the second material and the first melting point is the same as the second melting point.

3. The system of claim 1 wherein the first material is different than the second material and the first melting point is different than the second melting point.

4. The system of claim 1 wherein the first material is one of copper, nickel, and titanium, and wherein the second material is one of copper, nickel, and titanium.

5. The system of claim 1 wherein the first coating layer comprises between about 2% weight and about 13% weight phosphorus in nickel-phosphide and wherein the enhanced coating layer comprises about 70% weight to 100% weight nickel at the weld portion.

6. The system of claim 1 wherein the first and second electrodes are configured to heat the stackup with a mechanical load to the third melting point to allow crystallization of nickel in the weld portion of the first coating layer and remove the residual nickel-phosphide from the weld portion.

7. The system of claim 1 wherein the first and second electrodes are configured to heat the stackup with a mechanical load to melt the nickel-phosphide in the first coating layer, to allow crystallization of nickel in weld portion of the first coating layer and to remove the residual nickel-phosphide from the weld portion.

8. The system of claim 1 wherein the first and second electrodes are configured to heat the stackup to the third melting point based on percent weight content of phosphorous in nickel-phosphide for the first coating layer.

* * * * *